(12) United States Patent
Hougen et al.

(10) Patent No.: US 10,198,821 B2
(45) Date of Patent: Feb. 5, 2019

(54) AUTOMATED TATTOO RECOGNITION TECHNIQUES

(71) Applicant: MorphoTrak, LLC, Anaheim, CA (US)

(72) Inventors: Darrell Hougen, Littleton, CO (US); Peter Zhen-Ping Lo, Mission Viejo, CA (US)

(73) Assignee: MorphoTrak, LLC, Anaheim, CA (US)

( * ) Notice: Subject to any disclaimer, the term of this patent is extended or adjusted under 35 U.S.C. 154(b) by 0 days.

(21) Appl. No.: 16/106,717

(22) Filed: Aug. 21, 2018

(65) Prior Publication Data

US 2018/0357768 A1  Dec. 13, 2018

Related U.S. Application Data

(63) Continuation of application No. 15/262,379, filed on Sep. 12, 2016, now Pat. No. 10,062,172.

(51) Int. Cl.
*G06T 7/11* (2017.01)
*G06T 7/33* (2017.01)
(Continued)

(52) U.S. Cl.
CPC .................. *G06T 7/11* (2017.01); *G06K 9/00* (2013.01); *G06K 9/3241* (2013.01);
(Continued)

(58) Field of Classification Search
CPC ....... G06T 7/0002; G06T 7/0012; G06T 7/11; G06T 7/41; G06T 7/73; G06T 7/90;
(Continued)

(56) References Cited

U.S. PATENT DOCUMENTS

| 9,208,404 | B2 | 12/2015 | Lin |
| 10,062,172 | B2 | 8/2018 | Hougen |
| 2018/0075603 | A1 | 3/2018 | Hougen |

OTHER PUBLICATIONS

Jain et al., "Tattoo-id: automatic tattoo image retrieval for suspect and victim identification," Proc. of the multimedia 8th Pacific Rim conference on Advances in multimedia information processing, PCM'07, Springer-Verlag, Berlin, Heidelberg (2007), 10 pages.
(Continued)

*Primary Examiner* — Daniel G Mariam
(74) *Attorney, Agent, or Firm* — Fish & Richardson P.C.

(57) ABSTRACT

In some implementations, a computer-implemented method is capable of automatically segmenting and detecting a tattoo within an image. An image may be initially obtained. A block coverage pattern that identifies multiple blocks within the obtained image may be determined. A set of processing operations may then be performed for each block. The processing operations may include calculating a plurality of statistical features. A confidence score reflecting a likelihood that at least a portion of the block includes a predetermined graphical attribute associated with tattoos may be calculated. A subset of the multiple blocks of the image that have a respective confidence score greater than a predetermined threshold value may be identified. A portion of the image that includes one or more blocks from among the subset of the multiple blocks may then be determined to correspond to a tattoo.

20 Claims, 7 Drawing Sheets

(51) Int. Cl.
| | |
|---|---|
| *G06T 7/00* | (2017.01) |
| *G06K 9/66* | (2006.01) |
| *G06K 9/00* | (2006.01) |
| *G06T 7/90* | (2017.01) |
| *G06T 7/35* | (2017.01) |
| *G06K 9/62* | (2006.01) |
| *G06K 9/46* | (2006.01) |
| *G06K 9/32* | (2006.01) |
| *G06T 7/73* | (2017.01) |

(52) U.S. Cl.
CPC ........... *G06K 9/4642* (2013.01); *G06K 9/627* (2013.01); *G06K 9/66* (2013.01); *G06T 7/0002* (2013.01); *G06T 7/337* (2017.01); *G06T 7/35* (2017.01); *G06T 7/73* (2017.01); *G06T 7/90* (2017.01)

(58) Field of Classification Search
CPC ..................... G06T 7/136; G06T 7/337; G06T 2207/30088; G06K 9/00; G06K 9/0061; G06K 9/00362; G06K 9/6202; G06K 9/66; G06K 9/00885; G06K 9/3241; G06K 9/4671; G06K 9/4642; G06K 9/627; G06K 2209/05

USPC .......................................... 382/173, 175, 224
See application file for complete search history.

(56) References Cited

OTHER PUBLICATIONS

Heflin et al., "Detecting and classifying scars, marks, and tattoos found in the wild," Proceedings of the IEEE International Conference on Biometrics: Theory, Applications and Systems, pp. 31-38, 2012.

Allen et al., "Unsupervised tattoo segmentation combining bottom-up and top-down cues", Proceedings of the SPIE 8063, Mobile Multimedia/Image Processing, Security, and Applications, 2011, 9 pages.

P. Duangphasuk and W. Kurutach, "Tattoo skin detection and segmentation using image negative method," Proceedings of the 13th International Symposium on Communications and Information Technologies, pp. 354-359, 2013.

Ngan, et al. (Tattoo Recognition Technology-Challenge (Tatt-C) Outcomes and Recommendations Revision 1.0),Sep. 6, 2016, pp. 1-20.

TATOO SEGMENTATION

AUTOMATED TATTOO RECOGNITION TECHNIQUES

CROSS-REFERENCE TO RELATED APPLICATIONS

This application is a continuation application of and claims priority to U.S. application Ser. No. 15/262,379, filed on Sep. 12, 2016.

FIELD

The present specification relates generally to tattoo detection systems.

BACKGROUND

Automatic biometric identification systems are commonly used in many contexts to efficiently identify and verify the identity of individuals. For instance, automatic tattoo systems often make such identification or verification based on distinctive characteristics of tattoos present on a target's skin. In such systems, color or grayscale characteristics are extracted from an image that includes a tattoo and compared to a set of previously collected reference images.

SUMMARY

The performance of tattoo detection techniques is often strongly correlated to the accuracy of segmentation techniques used to extract features associated with a region that potentially includes a tattoo within an input image. However, many tattoo segmentation techniques (e.g., skin-based detection) are often inaccurate when applied to low quality images because of variations in illumination across images, among other complicating factors.

Accordingly, one innovative aspect described throughout this specification includes systems and techniques capable of performing automatic tattoo segmentation and detection to improve tattoo recognition of low quality images. The tattoo segmentation and detection techniques described herein are based on processing local information associated with a set of regions within an input image, as well as global information associated with the arrangement and/or size of a set of candidate tattoo regions within the input image.

The first stage of the segmentation and detection techniques described herein can be used to accurately discriminate between tattoo and non-tattoo regions within an input image. For example, the use of segmentation techniques enables the tattoo analysis system to automatically identify candidate tattoo regions that are highly likely to include a whole or part of a tattoo, and identify non-specific regions that are not likely to include a tattoo. The second phase of the segmentation and detection techniques can then be used to increase overall accuracy of tattoo detection within the input image. For example, global geometric relationships between each of the identified candidate tattoo regions from the segmentation stage can be analyzed in order to make an accurate tattoo detection determination.

Implementations may include one or more of the following features. For example, a computer-implemented method may include a set of operations. The operations may include obtaining an image; determining a block coverage pattern that identifies multiple blocks within the obtained image; for each block of the multiple blocks of the obtained image calculating a plurality of statistical features. The operations may also include computing, based at least on the calculated statistical features of the particular block, a confidence score reflecting a likelihood that at least a portion of the particular block includes a predetermined graphical attribute associated with tattoos. The operations may also include identifying a subset of the multiple blocks of the image that have a respective confidence score greater than a predetermined threshold value, and determining, based at least on the computed confidence score for the blocks of the identified subset of the multiple blocks, that at least a portion of the image that includes one or more blocks from among the subset of the multiple blocks corresponds to a tattoo.

Other versions include corresponding systems, and computer programs, configured to perform the actions of the methods encoded on computer storage devices.

One or more implementations may include the following optional features. For example, in some implementations, computing the confidence score reflecting a likelihood that at least a portion of the particular block includes a predetermined graphical attribute associated with tattoos includes: computing, by a trained classifier, an individual confidence score for each of a plurality of statistical features of the particular block and; aggregating, by the trained classifier, the individual confidence scores for each of the plurality of statistical features for the particular block; and computing, by the trained classifier, the confidence score based on aggregating the individual confidence scores for each of the plurality of statistical features for the particular block.

In some implementations, the method may further include: obtaining a plurality of reference images that each include a manually lassoed tattoo region; determining a block coverage pattern for each of the plurality of reference images, each block coverage pattern identifying multiple blocks within the manually lassoed tattoo region of each of the plurality of reference images; computing a plurality of statistical features of each of the multiple blocks within each of the manually lassoed region of each of the plurality of reference images; and training a classifier based at least on the plurality of computed statistical features.

In some implementations, the method may further include performing one or more morphological operations on the identified subset of the multiple blocks of the image that have a respective confidence score greater than the predetermined threshold value.

In some implementations, the method may further include generating one or more bounding boxes for the identified subset of the multiple blocks of the image.

In some implementations, generating the one or more bounding boxes for the identified subset of the multiple blocks of the image includes generating an individual bounding box for each block from among the identified subset of the multiple blocks of the image.

In some implementations, the method further includes combining the generated individual bounding boxes into one or more distinct polygonal regions.

In some implementations, the plurality of statistical features includes at least one of: statistics related to color values, ratios of color values, edge characteristics, texture characteristics, or characteristics of colored textures.

In some implementations, determining that at least a portion of the image that includes one or more blocks from among the subset of the multiple blocks that corresponds to a tattoo includes: counting a number of candidate blocks within the multiple blocks of the image that have a respective confidence score greater than a predetermined threshold value; and determining that the counted number of candidate blocks exceeds a threshold value.

In some implementations, the number of multiple blocks is larger than a predetermined threshold value associated with a tattoo image, and determining that at least a portion of one or more blocks from among the subset of the multiple blocks of the image includes the predetermined graphical attribute associated with tattoos is based at least on detecting a connected component within the multiple blocks.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, this specification describes systems and techniques that are capable of performing automatic tattoo segmentation and detection of an input image. The tattoo segmentation and detection techniques are based on processing local information associated with a set of regions within an input image, as well as global information associated with the arrangement and/or size of a set of candidate tattoo regions within the input image.

In the tattoo segmentation phase, the input image may initially be divided into multiple blocks. Statistical features representing different image characteristics are computed for each block within the input image. A trained classifier is then used to analyze the computed statistical features and calculate respective confidence levels that indicate the likelihood that each block includes at least a portion of a tattoo. The blocks that are determined to have a confidence level that satisfies a threshold are then selected as candidate tattoo regions.

In the detection phase, each individual candidate tattoo region is processed and analyzed based on global features within the entire image. For instance, one or more bounding boxes may initially be generated for the candidate tattoo regions based on the locations, sizes, and/or closeness of each of the candidate tattoo regions in relation to the original input image. Attributes associated with each bounding box are then analyzed to make a determination as to whether each bounding box includes a tattoo. For example, such attributes may include the size of each bounding box (e.g., number of pixels included within the bounded region), average confidence level values for nearby bounding boxes, among others.

The following detailed description of the implementations of the disclosure refers to the accompanying drawings. The same reference numbers in different drawings may identify the same or similar elements. In addition, the following detailed description provides exemplary implementations of the concepts described within the claims, and should not be read as to limit their scope.

Tattoo Segmentation Detection Overview

Figure 1A:
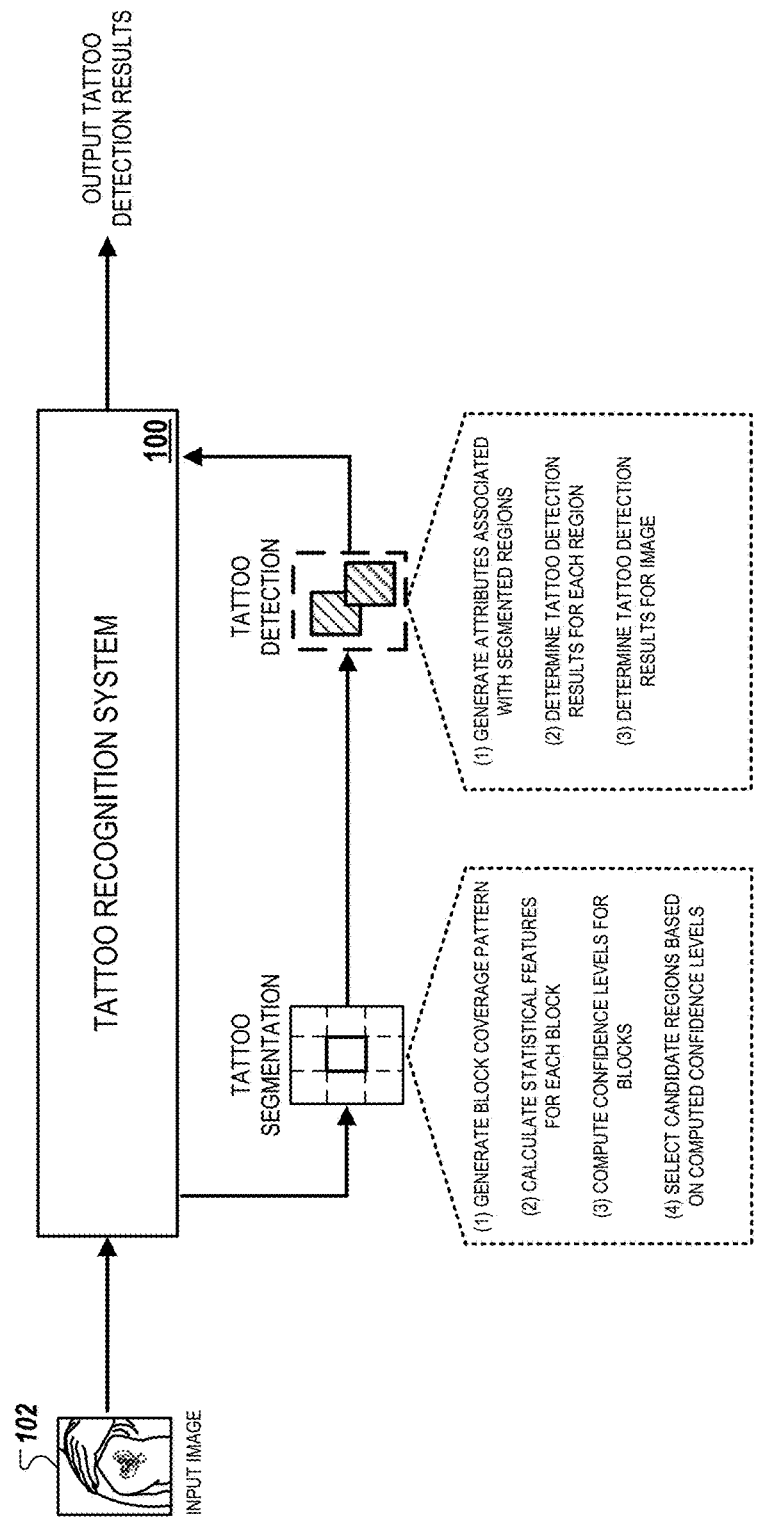
FIG. 1A illustrates a conceptual diagram for an automatic tattoo segmentation and detection process.

FIG. 1A illustrates a conceptual diagram for an automatic tattoo segmentation and detection procedure performed by a tattoo analysis system 100. The system 100 initially receives an input image 102 that potentially includes a tattoo image. The system processes the input image, and outputs tattoo detection results based on performing the automatic tattoo segmentation and detection procedure.

The system 100 initially performs a segmentation operation by identifying multiple regions within the input image 102. The segmentation operation generally includes generating a block coverage pattern, calculating a set of statistical features for the each block, computing respective confidence level scores for each block, and selecting a subset of the blocks that have a respective confidence level score that exceeds a predetermined threshold. Regions of the input image 102 that include the selected subset are designated by the system 100 as candidate tattoo regions. More particular descriptions related to the tattoo segmentation operation is described below with respect to FIG. 2A.

The system 100 then performs a detection operation by analyzing the global geometric properties for the candidate tattoo regions within the input image 102. The detection operation generally involves generating attributes associate with the segmented regions. The tattoo detection results may then be provided for output. For example, in some instances, the tattoo detection results may be cross-referenced against other types of image detection techniques (e.g., facial recognition, fingerprint detection) of images that are associated with the input image 102 (e.g., fingerprint or facial images collected along with the input image 102). More particular descriptions related to the tattoo detection operations are provided below with respect to FIG. 2B.

System Architecture

Figure 1B:
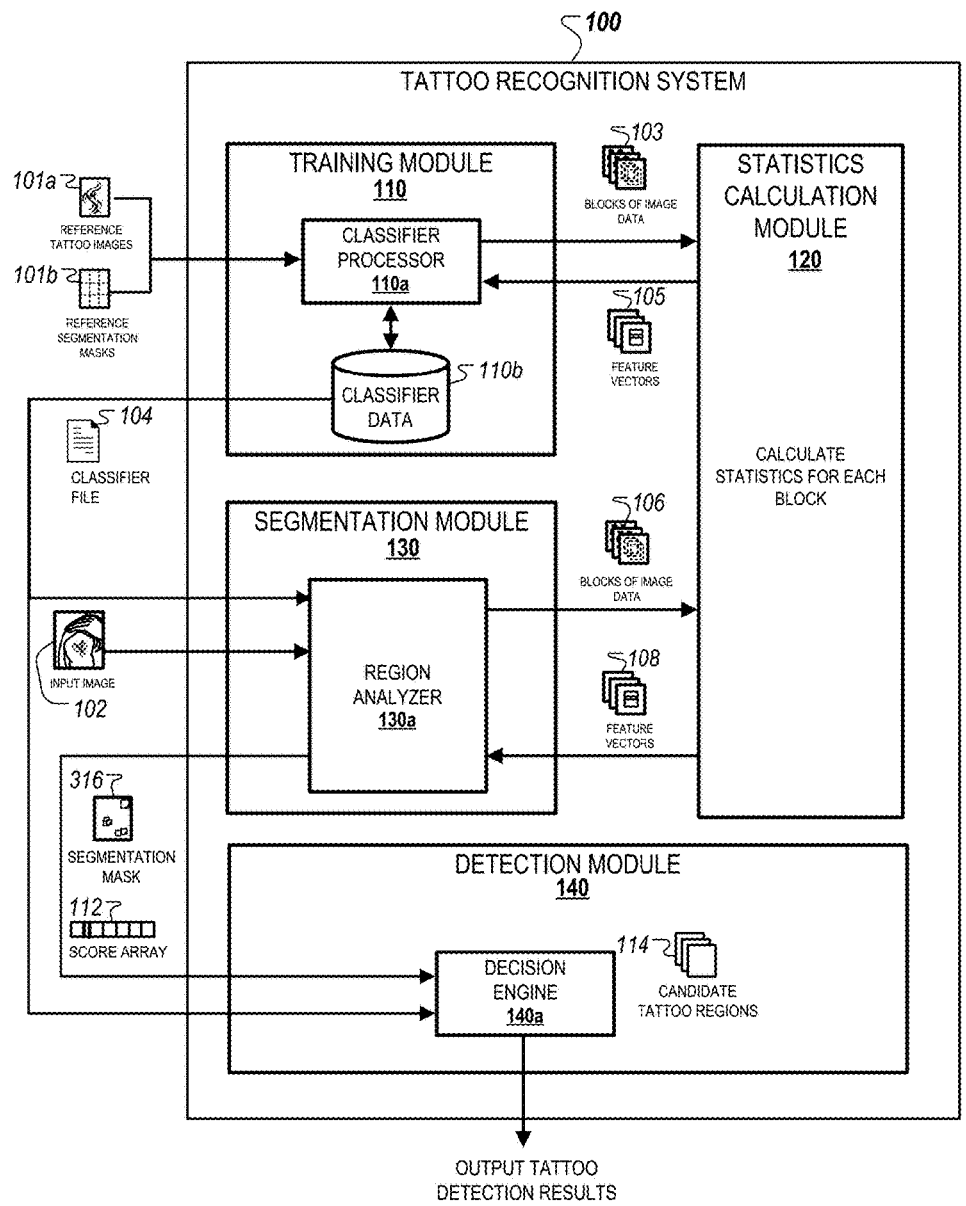
FIG. 1B illustrates a block diagram of an exemplary tattoo analysis system.

FIG. 1B illustrates an exemplary architecture of the tattoo detection system 100. The system 100 generally includes a training module 110, a statistics calculation module 120, a segmentation module 130, and a detection module 140. The training module further includes a classifier processor 110a that creates a statistical classifier stores it as classifier data 110b. The statistics calculation module 120 further includes a region coverage pattern determiner 120a and a statistics estimation engine 120b. The segmentation module 130 further includes a region analyzer 130a. The detection module 140 further includes a decision engine 140b.

While the system 100 may be implemented in a variety of software programs, in some instances, the system 100 is implemented as a shared library (e.g., a dynamic link library) that contains code and data that may be used by multiple programs with the use of particular drivers. In such implementations, each of the training module 110, the segmentation module 130, the statistics calculation module 120, and the detection module 140 may represent a separate software program that each independently operates from one another. Alternatively, in other instances, each of the training module 110, the segmentation module 130, the statistics calculation module 120, and the detection module 140 may represent modules/components of a single software application.

In general, the system 100 may perform operations in three phases. In the training phase, the training module 110 generates and trains a classifier based on a set of reference tattoo images 101a and reference segmentation masks 101b, along with a set of feature vectors 105 that are calculated for multiple regions within each of the reference tattoo images 101a by the statistics calculation module 120.

In the tattoo segmentation phase, the statistics calculation module 120 generates a set of feature vectors 108 for each block 106 of the input image 102. The region analyzer 130a uses the generated set of feature vectors 108 to compute confidence levels for each block 106 within the block coverage pattern. The blocks may be further analyzed and combined into regions representing all or part of a tattoo.

In the tattoo detection phase, a score array 112 including each of the confidence levels computed by the region analyzer 130a is used by the decision engine 140a to identify a set of candidate tattoo regions 114 that each has a confidence level value above a predetermined threshold. Attributes of the candidate tattoo regions 114 are then analyzed by the decision engine 140b using the classifier 104 in order to generate a tattoo detection result indicating whether the input image 102 includes a partial or whole tattoo. The descriptions below with respect to FIGS. 2A-2C provide more particular details related to each of the training, tattoo segmentation, and tattoo detection procedures.

Classifier Training

Figure 2:
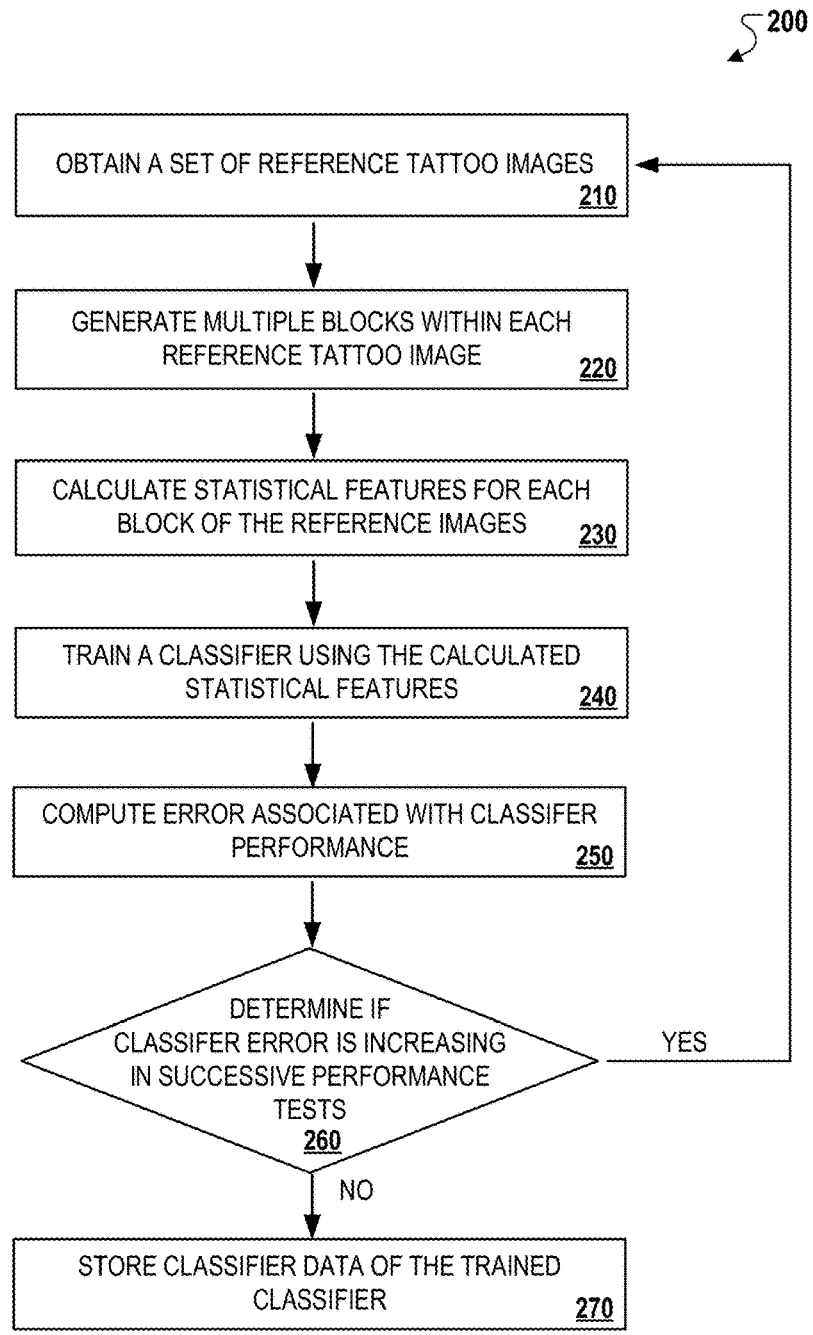
FIG. 2 illustrates a block diagram of a process for training a classifier used to automatically segment and detect tattoos.

FIG. 2 illustrates a block diagram of a process 200 for training a classifier used to automatically segment and detect tattoos. Briefly, the process 200 may include obtaining a reference tattoo image including a manual lassoed region (210), generating multiple blocks within the reference tattoo image (220), calculating statistical features for each block of the reference image (230), training classifiers using one or more feature vectors (240), computing an error associated with classifier performance (250), determining if classifier error is increasing in successive performance tests (260), and storing classifier data of the trained classifier if the classifier error is not increasing in successive performance tests (270).

In more detail, the process 200 may include obtaining a set of reference tattoo images including a manually lassoed region (210). For instance, the classifier processor 110a of the training module 110 may obtain a set of reference images 101a that each include a manually lassoed region corresponding to a tattoo. The classifier processor 110a may also obtain a set of reference segmentation masks that identify locations of tattoos within the reference tattoo images 101a.

The set of reference images 101a can include a diverse set of images that include a large variety of tattoos of different shapes, patterns, or sizes. In some instances, the set of reference images 101a also includes images of varying image qualities. The set of reference images 101a can also include different images where one or more tattoos are located in different regions within the image. The different types of reference images are included in the set of reference images 101a in order to generate a robust classifier after performing a training procedure using a training dataset generated based on the reference tattoo images 101a.

The reference tattoo images included in the set of reference tattoo images 101a include manually lassoed regions. These regions may be drawn by an examiner and used as a reference to compare against a classifier prediction of a corresponding tattoo region when evaluating the detection performance of a trained classifier. The manually lassoed regions may also include other backgrounds surrounding a tattoo in order to train a classifier to effectively discriminate between a detected tattoo pattern and surrounding skin and/or backgrounds.

During a training procedure of a classifier, as discussed in the steps below, the classifier processor 110a processes each of the reference images 101a on an image-by-image basis. For instance, in some implementations, the classifier processor initially pre-processes each reference image within the reference tattoo images 101a prior to initiating the training procedure of a pre-trained classifier. Alternatively, in other implementations, the pre-processing of each individual reference image may be sequentially performed with a respective training procedure with each individual image.

The process 200 may include generating multiple blocks within the reference tattoo image (220). For instance, the classifier processor 110a generates multiple blocks within each reference image.

In some implementations, the blocks generated within each of the multiple reference images share the same parameters (e.g., shape, size, overlapping portion size) in order to reduce the processing resources associated with processing all of the reference images included within the set of reference images 101a. In such implementations, one particular configuration may specify a region size of forty by forty pixels for each generated region, with a distance of ten pixels between the centers of each region and the centers of adjacent blocks. In other implementations, the multiple blocks generated for each reference image may differ based on the specific attributes associated with an individual reference image. For example, as described more particularly with respect to tattoo segmentation techniques in FIG. 3A, the region sizes may be based on the size of the tattoo within an image in relation to the image size (and pixel size). In another example, the amount of overlap between adjacent blocks within an individual image may be based on the image quality associated with the individual image. In some instances, an individual image may include blocks of different sizes in various locations of the image. In such instances, the size of a particular region may be based on local or geometric features (e.g., distortions) within the individual image.

In some implementations, prior to generating the multiple blocks, the classifier processor 110a may initially process each reference imagine within the set of reference tattoo images 101a to erode areas along the tattoo border specified by the manual lassoes. The erosion is used to eliminate blocks within each reference image that only include partial tattoos so that the multiple blocks generated for each reference image of tattoo images only contain tattoo or non-tattoo blocks. The classifier is subsequently trained using only tattoo or non-tattoo blocks of the set of reference images 101a.

After generating the multiple blocks for each reference image within the set of reference tattoo images 101a, the classifier processor 110a then transmits a set of blocks 103 that includes multiple blocks for each individual reference image to the statistics calculation module 120.

The process 200 may include calculating statistical features for each region of the reference image (230). For instance, the statistics calculation module 120 may calculate the set of feature statistics 105 for each individual block within the set of blocks 103. As discussed previously with respect to step 220, the set of segmented regions 130 includes multiple blocks generated for each individual image within the set of reference tattoo images 101. The statistics calculation module 120 may also obtain the set of reference segmentation masks 101*b* in order to calculate the feature statistics.

The statistics calculation module 120 calculates feature statistics for each region of an individual image on an image-by-image basis, and then aggregates the generated feature statistics for all regions of an individual image. Stated another way, the statistics calculation module 120 generates feature vectors 105 that specifies a plurality of feature vectors for each individual reference image corresponding to the multiple regions included within each individual image. Each individual feature vector includes the set of calculated feature statistics computed by the statistics calculation module 120 for a particular region. More particular descriptions related to techniques used by the statistics calculation module 120 to calculate feature statistics are provided below with respect to tattoo segmentation techniques in FIG. 3A and in the Examples section. The generated feature vectors 105 are provided to the classifier processor 110*a* to a perform classifier training procedure.

The process 200 may include training classifiers using the feature vectors (240). For instance, the classifier processor 110*a* uses the feature vectors 105 generated by the statistics calculation module 120 to train a pre-trained classifier. In general, the pre-trained classifier may be any type of software that is capable of using statistical learning techniques to calculate statistical probabilities related to a set of decisions associated with different predictions related to test data. For example, the pre-trained classifier may be one of a random forest classifier, a support vector machine, a neural network, or any other type of pattern classifier.

The classifier processor 110*a* generally trains the pre-trained classifier by iteratively evaluating its performance in identifying regions within the feature vectors 105 that are predetermined to be associated a whole or partial tattoo. During initial iterations of the training procedure, the classifier processor 110*a* compares the generated regions 103 for each individual reference image against a corresponding reference segmentation mask that identifies the manually lassoed regions associated with tattoos within the reference image. The classifier processor 110*a* then labels the feature vectors 105 to identify particular regions that are tattoo regions (e.g., regions that are indicated to include a whole or partial tattoo based on the corresponding reference segmentation mask), and other regions that are non-tattoo regions (e.g., regions that are not indicated to include a tattoo based on the corresponding reference segmentation mask). The labelled feature vectors are then stored as classifier data.

The process 200 may include computing an error associated with classifier performance (250). For instance, after initially configuring the pre-trained classifier in step 240, the classifier processor 110*a* may then evaluate the performance of a trained classifier in predicting the presence of a tattoo within a set of reference tattoo images using a set of evaluation criteria. The evaluation criteria can include relative detection accuracy (e.g., percentage of false positive detections, percentage of false negative detections), or accuracy of region identification (e.g., correspondence between a predicted size of a tattoo region by the trained classifier and the area specified by a manually lassoed region). In this regard, the evaluation criteria ensure that the trained classifier not only accurately detects a tattoo within an image, but accurately represents the predicted areas within the image that are determined to be associated with a tattoo.

The classifier processor 110*a* then computes the error associated with the trained classifier based on the set of performance criteria. For example, the classifier processor 110*a* may compute an aggregate score that combines respective scores associated with each individual performance criterion. The aggregate error score can either be an average of the respective scores, or a combination of scores using different weighting factors associated with each performance criterion.

The process 200 may include determining if classifier error is increasing in successive performance tests (260). For instance, the classifier processor 110*a* may compare the respective aggregate error scores measured for the trained classifier measured in consecutive iterations of the training procedure, and determine if the error is increasing or not. For example, if the classifier error is determined to increase between multiple iterations, then the classifier processor 110*a* determines that the classifier requires additional training and re-performs steps 210-250.

Alternatively, if the classifier error is determined to consistently remain the same (or possibly decrease) between consecutive training iterations, then the classifier processor 110*a* determines that the classifier has been sufficiently trained because it has achieved an acceptable level of performance. In some implementations, the classifier processor 110*a* may compare the computed error to a threshold number of prior iterations (e.g., six iteration cycle) at each instance to determine if the trained classifier has achieved an acceptable level of performance.

The process 200 may include storing classifier data of the trained classifier if the classifier error is not increasing in successive performance tests (270). For instance, once the classifier processor 110*a* determines that the trained classifier has achieved an acceptable level of performance indicated by a consistent classifier error between successive training procedures, the classifier processor 110*a* may then store classifier data associated with the trained classifier. The classifier data can include the configuration associated with optimal performance, and/or other associated computer-implemented instructions for executing the trained classifier. The trained classifier is then stored in an associated database as a classifier file 104. The stored classifier 104 can subsequently be accessed by the segmentation module 130 or the detection module 140 during respective operations discussed more particularly below.

Tattoo Segmentation

Figure 3A:
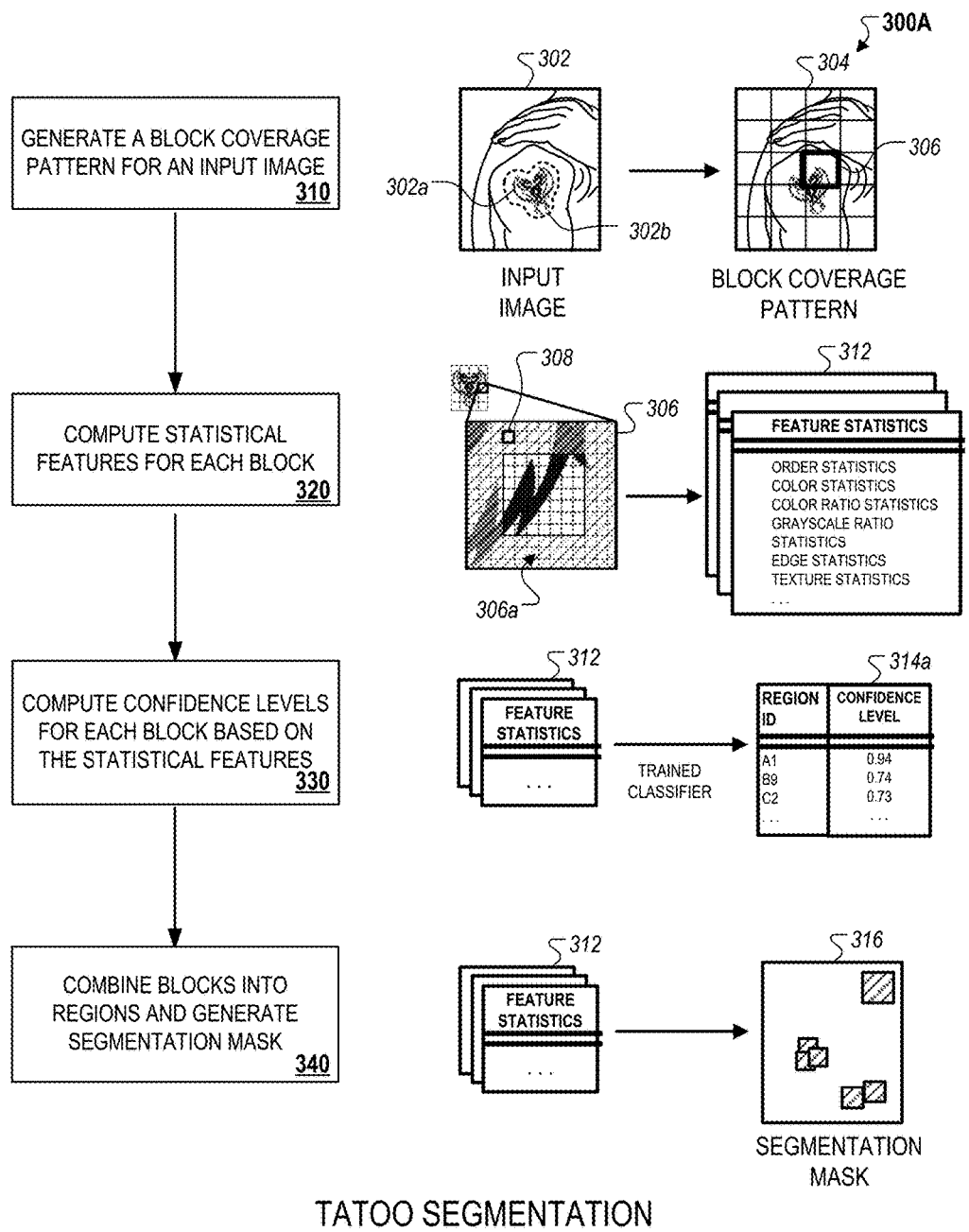
FIG. 3A illustrates a conceptual diagram for an exemplary tattoo segmentation procedure.

FIG. 3A illustrates a conceptual diagram for an exemplary tattoo segmentation operation 300A. Briefly, the operation 300A includes generating a block coverage pattern for the input image (310), computing statistical features for each block (320), computing confidence scores for each block based on the statistical features (330), and combining blocks into regions and generating a segmentation mask (340).

In more detail, the operation 300A includes generating a block coverage pattern for the input image (310). For instance, an input image 302 to be analyzed may initially be obtained. The input image 302 may include a tattoo 302*a* that is initially unknown at the time the input image 302 is obtained, but subsequently identified as the process 300A is performed. In some instances where the system performs a training operation, the input image 302 may include a manually lassoed region 302*b* that identifies the region within the image that includes the tattoo 302*a*.

After obtaining the input image 302, the region analyzer 130*a* may generate a block coverage pattern 304 that identifies multiple blocks within the input image 302. Each block 306 may represent a portion of the input image with a predetermined area. The size of each block 306 may be adjusted based on the requirements for the tattoo identification operation. For example, the size of each block 306 may be reduced if the expected size of a tattoo is known to be small relative to the size of the input image 302.

As described below, blocks within the block coverage pattern that are determined to include a portion of a tattoo may subsequently be combined into a candidate tattoo region in step 340.

Each block 306 may include an overlapping portion 306a that is shared between multiple blocks. For example, the overlapping portion 306a may include a pixel 308 that is included within multiple blocks 306. The size of the overlapping portion 306a may be adjustable based on image attributes associated with the input image 302. In one particular example, the image quality of the input image 302 may be used to determine the size of the overlapping portion 306a for each block 306. For example, the region analyzer 130a may select a large overlapping portion 306a size for low quality input images that have high background noise that causes significant pixel-to-pixel variability within the input image 302.

After configuring the various segmentation parameters (e.g., size of the block 306, size of the overlapping portion 306a, etc.), the region analyzer 130a then segments the input image 302 to extract each of the blocks 306 from the input image 302. For example, the extracted images may correspond to the blocks 106 as depicted in FIG. 1B. The extracted blocks are then transmitted to the statistics calculation module 120.

The operation 300A includes computing statistical features for each block (320). For instance, after the statistics calculation module 120 computes a set of feature statistics 312 for each block 306 included within the processed image 306.

The feature statistics 312 computed for each block 306 may include various assessments of image attributes associated with each block 306. Examples of feature statistics 312 may include order statistics, color statistics, ratio statistics, grayscale region statistics, edge statistics, texture statistics, among others. Detailed descriptions related to the various types of statistics calculated by the statistics calculation module 120 are provided with respect to the "Feature Statistics" section below.

The operation 300A includes computing confidence scores for each block based on the statistical features (330). For instance, the region analyzer 130a of the segmentation module 130 uses the trained classifier 104 to compute respective confidence levels for each block 306 based on list of feature statistics 312 computed for each block 306. The region analyzer 130a aggregates the calculated data included within the list of feature statistics 312, and then performs a set of classification techniques to assign values based on the training data described previously with respect to FIG. 2.

The confidence levels for each block in 306 are calculated by aggregating individual confidence levels for each calculated feature statistic using the trained classifier 104. For example, the classifier 104 may be used to initially predict individual values indicating a likelihood that a particular block resembles a tattoo with respect to a particular attribute associated with the feature statistic (e.g. color intensity). The region analyzer 130a then combines the individual scores for each feature statistic in order to compute the overall confidence level for each block 306. In some instances, the overall confidence level is computed by averaging the individual scores for each feature statistic. As described herein, the confidence level indicates a likelihood that a respective block 306 includes a whole or portion of a tattoo. The calculated confidence levels are provided for output to the tattoo detection module 140 as the score array 112.

The operation 300A includes combining blocks into regions and computing a segmentation mask for the input image (340). For instance, the region analyzer 130a may initially combine one or more approximate blocks within the input image 302 into larger regions. Blocks may be combined for a variety of reasons, for example, reducing the number of computations performed by the system. The region analyzer 130a then computes the segmentation mask 316 for the input image 102 based on the list of feature statistics 312. The segmentation mask is created by combining the scores of overlapping blocks in 306 to form regions. In the simplest case, the region analyzer 130a may simply average the confidence levels associated with overlapping blocks. In some instances, the characteristics of the regions including shape and proximity to other regions may be considered during the aggregation process. Each region formed by aggregating blocks is then assigned a confidence value that may depend upon the confidence values of the associated blocks, region shape, region size, and proximity to other regions. The segmentation mask 316 may be generated in a variety of formats. For example, in some implementations, the segmentation mask 316 is a score image that represents the computed confidence values for each of the segmented regions 306 in the corresponding locations within the input image 302.

In other implementations, the segmentation mask 316 represents a binary image in which individual pixel values are determined based on the computed confidence levels for each of the segmented regions 306. For example, a threshold may be applied such that pixel values within the segmentation mask are assigned based on whether the corresponding confidence levels computed for regions 316 satisfy the threshold. In other implementations, the segmentation mask 316 represents a file that includes identifying information for regions that have a computed confidence level above a predetermined threshold. For example, the segmentation may specify coordination locations within the input image 302, shape descriptions for the regions, or the number of regions that specify the predetermined threshold. The segmentation mask 316 is then provided with the score array 112 to the tattoo detection module 140.

Tattoo Detection

Figure 3B:
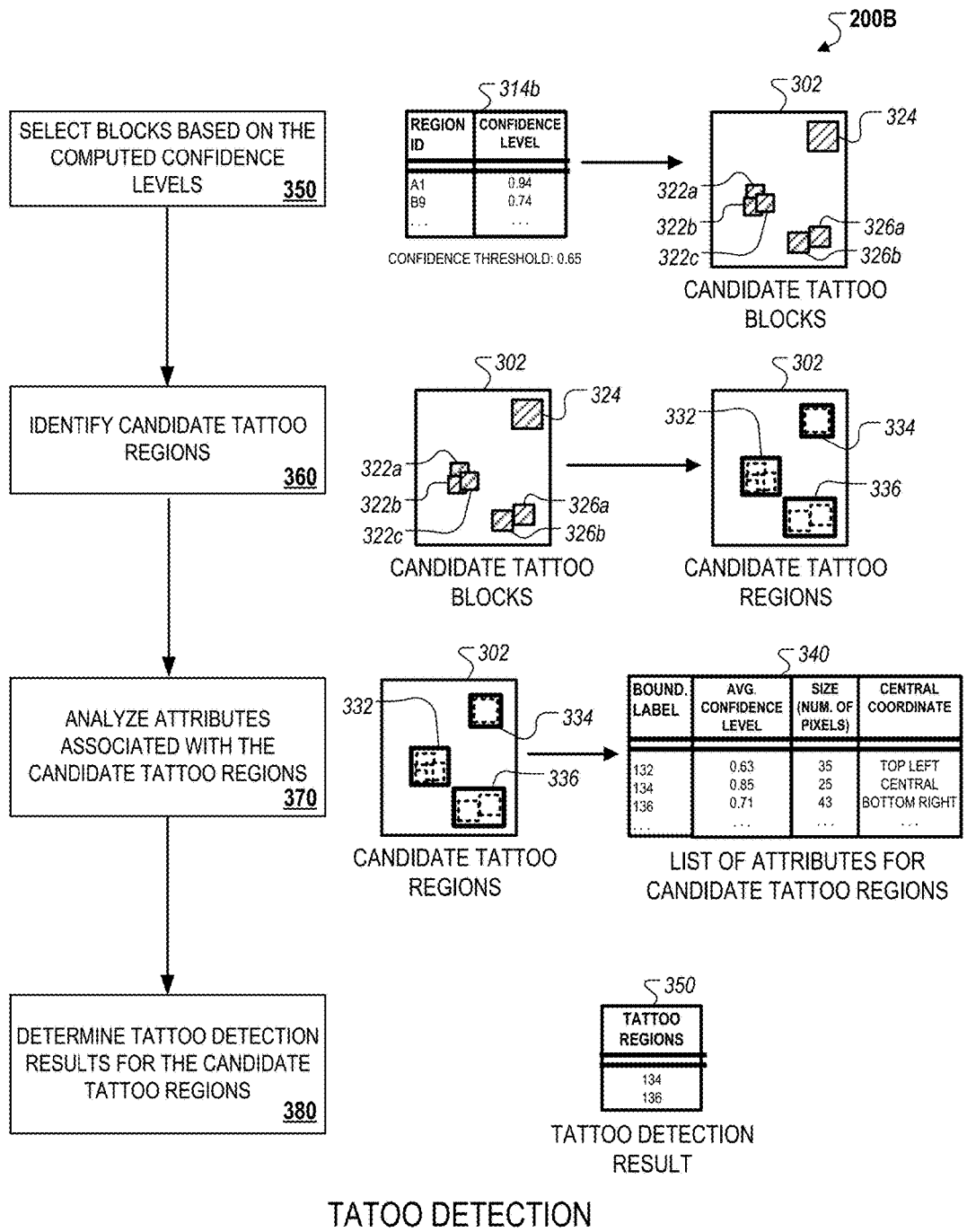
FIG. 3B illustrates a conceptual diagram for an exemplary tattoo detection procedure.

FIG. 3B illustrates a conceptual diagram for an exemplary tattoo detection operation 300B. Briefly, the operation 300B includes selecting candidate tattoo regions based on the values of the respective confidence scores (350), identifying candidate tattoo regions (360), analyzing attributes associated with the candidate tattoo regions (370), and determining tattoo detection results for the candidate tattoo regions (380).

In more detail, the operation 300B includes selecting candidate tattoo regions based on the values of the respective confidence scores (350). For instance, the decision engine 140a initially obtains the score array 112 and the segmentation mask 316 for the input image 302, and then identifies a set of candidate tattoo regions 322a-c, 324, and 326c within the input image 302. The candidate tattoo regions represent a subset of the segmented regions 316 that have computed confidence values greater than a predetermined threshold. The value for the predetermined threshold can be determined based on the training data used to train the trained classifier 104.

The size of each candidate tattoo region may vary based on the arrangement of individual blocks with confidence values greater than the predetermined threshold within the input tattoo image (or the processed image 304). For instance, if a particular region includes a high number of adjacent individual blocks, then then candidate tattoo region may be a large area that encompasses these adjacent individual blocks. In other instances, a candidate tattoo region may be small if, for example, only a single individual block is determined to have a confidence value greater than the predetermined threshold.

The operation 300B includes identifying candidate tattoo regions (360). For instance, the decision engine 140a may identify candidate tattoo regions 332, 334, and 336 based on combining individual blocks are proximate to one another within the input image 102. For instance, blocks 322a, 322b, and 322c may be identified as region 322, block 324 may solely be identified as the region 334, and the blocks 326a and 326b may be identified as the region 336.

The operation 300B includes analyzing attributes associated with the candidate tattoo regions (370). For instance, the decision engine 140a may process data included within each of the regions 332, 334, and 336 and generate a list of attributes 340 that identify properties associated with each region. In the example depicted in FIG. 3B, the list of attributes 340 includes an average confidence score within the region, an area associated with the region, and a location of the central coordinate within the input image 302. In other instances, other attributes may also be analyzed. The regions, and the list of attributes are then transmitted to the decision engine 140b as the candidate tattoo regions 114.

The operation 300B includes determining tattoo detection results for the candidate tattoo regions (380). For instance, the determination engine 140b of the tattoo detection module 140 receives information from the decision engine 140a and then makes determinations as to whether each of the candidate tattoo regions 114 include a whole or partial tattoo. This determination can be based on analyzing the list of attributes 340 associated with each of the regions 332, 334, and 336.

In some implementations, the tattoo determination is made based on comparing the average confidence level for a region to a predetermined threshold, and selecting regions that satisfy the threshold as areas within the input image 302 that are determined to be a whole or partial tattoo. In such implementations, the threshold value may be selected based on training data that includes reference images that are determined to be similar to that of the input image 302.

In other implementations, the tattoo determination is instead based on multiple thresholds that each represent a particular characteristic that is predetermined to be associated with a tattoo image. For example, the values for the multiple thresholds may be selected by the training module 110 based on training reference data using techniques described with respect to FIG. 2. In such implementations, the multiple thresholds can include an average confidence level threshold, an area threshold, among others. In such implementations, the tattoo determination for each region is based initially on comparing respective values for each of the attributes to the respective threshold values for the corresponding attributes, and then aggregating the comparisons using specific weights to make a final determination. The weights may be used to designate a relative importance to attributes based on the values calculated for a particular attribute. As an example, a region that includes a confidence level that is significantly above the threshold may nonetheless be identified as a non-tattoo region because the associated area is (i) located in a region of the input image 302 that is unlikely to include a tattoo image (e.g., near edges of the image), and/or (ii) is so small that it is unlikely to include a partial pattern for a tattoo given an anticipated size based on other features included within the input image 302. In this regard, the decision engine 140b may perform a multi-factorial analysis in order to reduce the likelihood of obtaining false positive and/or false negative results.

In some implementations, after identifying each of the candidate tattoo regions 114 that are determined to include a whole or partial tattoo, the decision engine 140a may then perform a post-processing technique to determine whether the identified tattoos are separate tattoos (e.g., multiple tattoos within a single image), or separate patterns of the same image (e.g., different portions of the same tattoo). For example, in some instances, the decision engine 140b may use pattern recognition techniques to determine whether the shapes, colors, objects, etc. detected within each of the regions constitute similar features that are likely to be associated with a pattern associated with a single tattoo. In other implementations, the decision engine 140b may package the data associated with the determined tattoo regions (e.g., the list of attributes 340), and provide the packaged data for output to an external component that compares the packaged data against a reference database of reference tattoo images and/or patterns to identify whether each of the multiple regions within the input image 302 constitutes a single tattoo or multiple tattoos.

Figure 4:
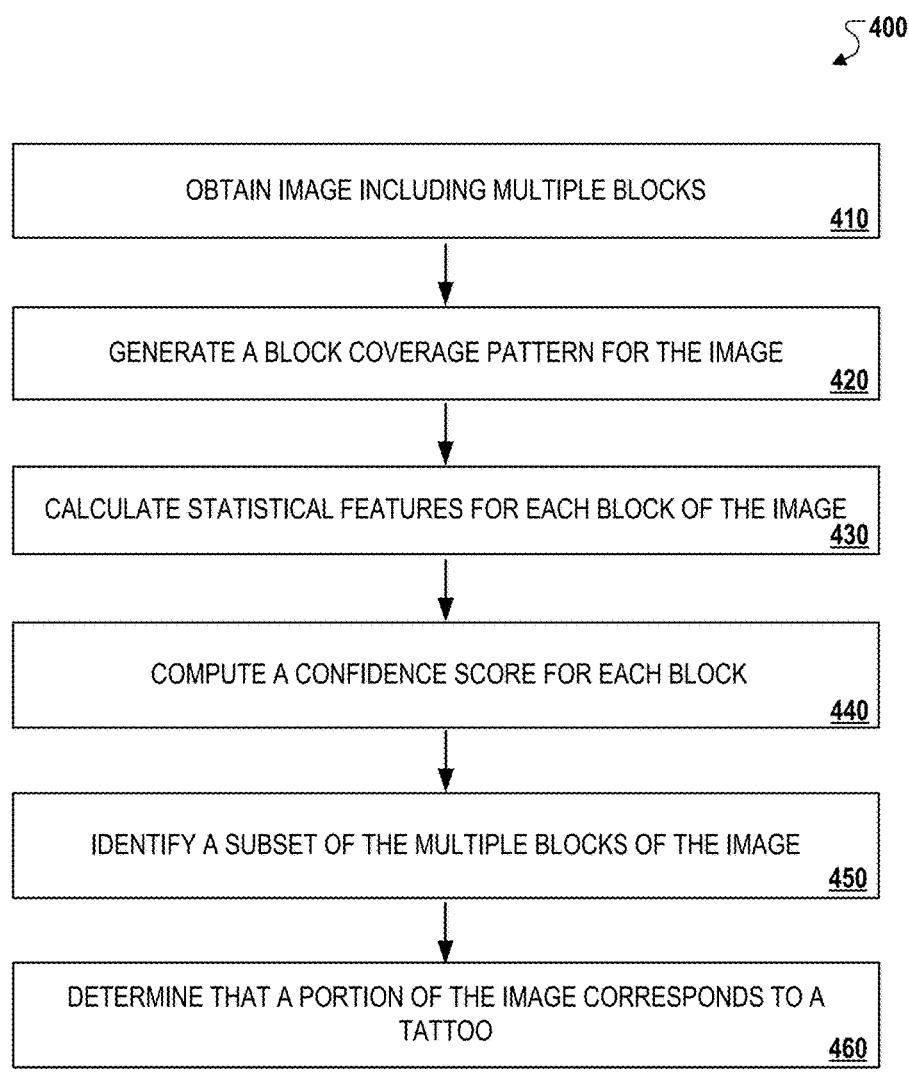
FIG. 4 illustrates a block diagram of a process for automatically segmenting and detecting a tattoo within a collected image.

FIG. 4 illustrates a diagram of a process 400 for automatically segmenting and detecting a tattoo within a collected image. Briefly, the process 400 may include obtaining an image (410), generating a block coverage pattern for the image (430), calculating statistical features for each block of the image (440), computing a confidence score for each block (450), identifying a subset of the multiple regions of the image (460), and determining that a portion of the image corresponds to a tattoo (470).

In more detail, the process 400 may include obtaining an image (410). For instance, the system 150 may obtain an input image 102 that potentially includes the candidate tattoo pattern.

The process 400 may include generating block coverage pattern for the image (420). For instance, the system 150 may generate a block coverage pattern that identifies multiple blocks within the input image 102. As described above, the block coverage pattern specifies a number of blocks that are identified within the input image 102 based on the size of each individual block. Each individual block includes a specified number of pixels within a particular area of the input image 102. The block size may be adjusted based on the requirements for the tattoo detection operation.

The process 400 may include calculating statistical features for each block of the image (430). For instance, the system 150 may calculate the set of statistical vectors 108 for each of the multiple blocks within the tattoo image 110. As described previously with respect to FIG. 1, the statistical features can include order statistics, color statistics, color ratio statistics, grayscale ratio statistics, edge statistics, texture statistics, among others.

The process 400 may include determining an area within the image associated with each block (440). For instance, the system 150 may determine the number of pixels that are included within each of the multiple blocks within the tattoo image 110. In other instances, other techniques may be used to determine the area of each block (e.g., using a calibrated distance to pixel size within the tattoo image). As described previously with respect to FIG. 1, the area associated with each block may be adjustable based on the attributes associated with the tattoo within the image, as well as the size of the tattoo patterns in relation to the pixel size of the captured image 102. In this regard, the area of each block may be dependent on the number of blocks that are generated for the tattoo image 110.

The process 400 may include computing a confidence score for each block (450). For instance, the system 150 may compute a respective confidence score for each block reflecting a likelihood that at least a portion of a particular block includes a predetermined graphical attribute associated with tattoos. As described previously with respect to FIG. 1A, computation of the respective confidence scores can be based using image processing techniques to identify the presence of such attributes within each of the image blocks.

The process 400 may include identifying a subset of the multiple blocks of the image (460). For instance, the system 150 may compare the computed respective confidence scores to a predetermined threshold and then identify the particular blocks that have an associated respective confidence score greater than the predetermined threshold. The predetermined threshold may be adjusted in order to modulate the sensitivity of the tattoo detection techniques described previously with respect to FIG. 1A.

The process 400 may include determining that a portion of the image corresponds to a tattoo (470). For instance, the system 100 may determine that at least a portion of input image 102 that includes some of the subset of the multiple blocks of the tattoo image 110 includes the predetermined graphical attribute associated with tattoos, indicating a high likelihood that the portions of the one or more blocks within the subset of multiple blocks includes a tattoo. This determination may be based on the areas within the image associated with the blocks of the identified subset of the multiple blocks, or the computed confidence score for the blocks of the identified subset of the multiple blocks.

Figure 5:
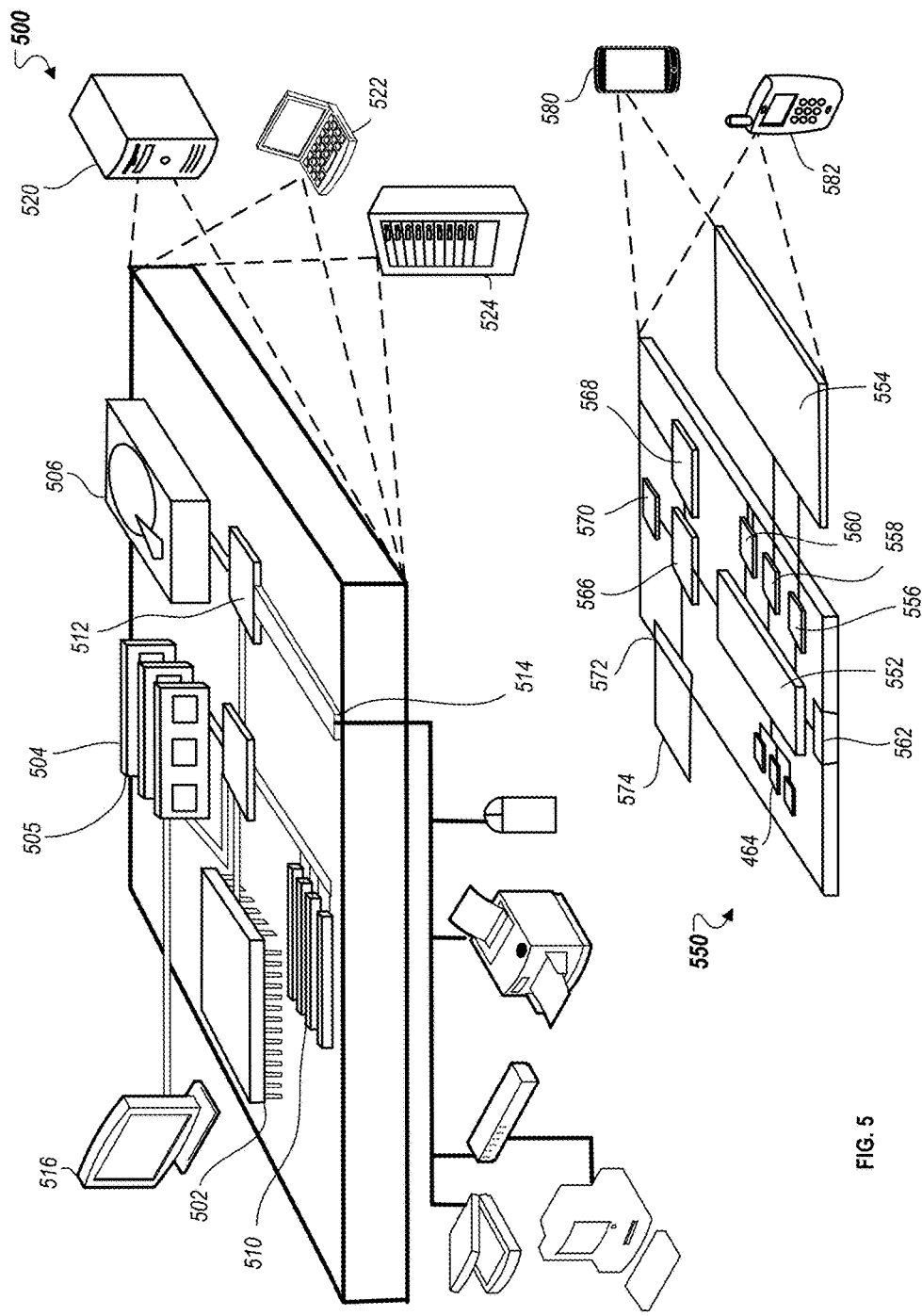
FIG. 5 is a block diagram of computing devices on which the processes described herein, or portions thereof, may be implemented.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices.

Additionally, computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a micro-drive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 456 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc. and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

EXAMPLES

This section provides examples of feature statistics that can be used by the tattoo segmentation module 130 of the tattoo recognition system 100 as described herein.

A. Order Statistics

In general, order statistics may be calculated by sorting pixels covered by a block according to a characteristic of the pixels. As an example, in a color image, pixel characteristics may include red, green, or blue values for each pixel or intensity of each pixel. Once each pixel has been sorted according to a chosen characteristic, a set of order statistics may be created by recoding the values of the characteristic corresponding to selected quantiles of data. For instance, calculated data may be divided into quartiles by recording intensity values for 25th, 50th, and 75th percentiles for the distribution of data values. In some instances, this may be accomplished by dividing the calculated data into twenty quantiles by setting thresholds at each 5th percentile increment. In other instances, this technique may be more efficiently performed by generating a histogram rather than sorting the data.

The generated order statistics can be used to identify the median value for a particular characteristic as this represents the value in which is only sensitive to effects that involve at least half of the pixels in a particular block 306. This value indicates that the corresponding pixel is unaffected by lines or edges that involve less than half of the pixels. For example, in the context of tattoo detection, the median value for a characteristic of a particular block 306 that contains mostly skin is not strongly affected by the presence of other material that occupies less than half of the block. In addition, 5th and 95th quantiles are affected by nearby features. However, the 5th quantile is unaffected by bright pixels while the 95th quantile is unaffected by dark pixels. Such quantiles are useful for identifying characteristics that are extreme within a particular block 306 while not being overly sensitive to outlying values. In this regard, because order statistics are robust, they provide a foundation upon which to build many of the feature statistics that are used in the tattoo classifier described previously with respect to FIG. 2.

Examples of Color Statistics Include:

The median of the red channel divided by the median intensity.

The median of the green channel divided by the median intensity.

The median of the blue channel divided by the median intensity.

The 5% intensity quantile divided by the median intensity.
The 5% red quantile divided by the median intensity.
The 5% green quantile divided by the median intensity.
The 5% blue quantile divided by the median intensity.
The 95% intensity quantile divided by the median intensity.
The 95% red quantile divided by the median intensity.
The 95% green quantile divided by the median intensity.
The 95% blue quantile divided by the median intensity.

B. Color Statistics

The color statistics are calculated by initially computing order statistics for each of the red, green, blue, and intensity characteristics of the pixels in a particular block of the input image 102. One set of statistics is then calculated by computing the ratio of the red, green, and blue median to the intensity median. Another is calculated by computing the ratio of the 5% quantile of each characteristic to the median of the intensity. The last is calculated using the ratio of the 95% quantile to the median intensity. Dividing by the median intensity makes the statistics in this set insensitive to the absolute brightness.

Examples of Color Statistics Include:

The fraction of pixels in a block for which the ratio of the red channel to the green channel is greater than a first fraction of the ratio of the red median to the green median.

The fraction of pixels in a block for which the ratio of the red channel to the green channel is greater than a second fraction of the ratio of the red median to the green median.

The fraction of pixels in a block for which the ratio of the red channel to the blue channel is greater than a first fraction of the ratio of the red median to the blue median.

The fraction of pixels in a block for which the ratio of the red channel to the blue channel is greater than a second fraction of the ratio of the red median to the blue median.

The fraction of pixels in a block for which the ratio of the green channel to the red channel is greater than a first fraction of the ratio of the green median to the red median.

The fraction of pixels in a block for which the ratio of the green channel to the red channel is greater than a second fraction of the ratio of the green median to the red median.

The fraction of pixels in a block for which the ratio of the green channel to the blue channel is greater than a first fraction of the ratio of the green median to the blue median.

The fraction of pixels in a block for which the ratio of the green channel to the blue channel is greater than a second fraction of the ratio of the green median to the blue median.

The fraction of pixels in a block for which the ratio of the blue channel to the red channel is greater than a first fraction of the ratio of the blue median to the red median.

The fraction of pixels in a block for which the ratio of the blue channel to the red channel is greater than a second fraction of the ratio of the blue median to the red median.

The fraction of pixels in a block for which the ratio of the blue channel to the green channel is greater than a first fraction of the ratio of the blue median to the green median.

The fraction of pixels in a block for which the ratio of the blue channel to the green channel is greater than a second fraction of the ratio of the blue median to the green median.

C. Color Ratio Statistics

Color ratio statistics are calculated using arrays of order statistics that are calculated over an extended distance. Such statistics are typically calculated over a 160-pixel by 160-pixel window. Since calculating order statistics over a large window size for overlapping windows can be computationally intensive, the input image 102 can typically be subsampled to reduce computational load during feature calculation. For example, a subsampling factor of three can be applied in both the x and y directions in order to make the feature calculation process nine times as fast.

The color ratio statistics are calculated by first computing the median of each of two different color bands over an extended block and from those medians calculating a median ratio. The median ratio is used to set thresholds for the regular block. Two thresholds are often used. Once the thresholds have been determined, the ratio of the same two colors is calculated independently for each pixel in a block and the number of pixels whose ratio is greater than each of the thresholds is recorded.

D. Grayscale Ratio Statistics

Grayscale ratio statistics are calculated by first calculating a threshold for each block that is dependent upon the extended median and counting the number of pixels with an intensity level that is less than that threshold. Since tattoos tend to be darker than the surrounding skin, the purpose of this statistic is to highlight blocks corresponding to a tattoo.

Examples of Grayscale Ratio Statistics Include:

The fraction of pixels in a block with intensity less than a first fraction of the median intensity.

The fraction of pixels in a block with intensity less than a second fraction of the median intensity.

E. Combination Color Ratio Statistics

Combination color ratio statistics combine the attributes embodied in the grayscale ratio statistics and the color ratio statistics. That is, pixels are only counted if the intensity is less than a certain proportion of the median intensity and the color ratio is greater than a certain proportion of the ratio of the medians of those two colors.

Examples of Combination Color Ratio Statistics Include:

The fraction of pixels in a block for which the intensity is less than a first fraction of the median intensity and the ratio of the green channel to the red channel is greater than a first fraction of the ratio of the green median to the red median.

The fraction of pixels in a block for which the intensity is less than a second fraction of the median intensity and the ratio of the green channel to the red channel is greater than a second fraction of the ratio of the green median to the red median.

The fraction of pixels in a block for which the intensity is less than a first fraction of the median intensity and the ratio of the blue channel to the red channel is greater than a first fraction of the ratio of the blue median to the red median.

The fraction of pixels in a block for which the intensity is less than a second fraction of the median intensity and the ratio of the blue channel to the red channel is greater than a second fraction of the ratio of the blue median to the red median.

F. Color Ratio Threshold Statistics

The color ratio threshold statistics are calculated by first computing the ratio of the medians of two color channels. That ratio is used to calculate order statistics using the ratio of two color channels divided by the ratio of the medians. Certain quantiles are then reported as statistics.

Examples of Color Ratio Threshold Statistics Include:

The 80% quantile of the ratio of the red channel to the green channel divided by the ratio of the red median to the green median.

The 90% quantile of the ratio of the red channel to the green channel divided by the ratio of the red median to the green median.

The 80% quantile of the ratio of the red channel to the blue channel divided by the ratio of the red median to the blue median.

The 90% quantile of the ratio of the red channel to the blue channel divided by the ratio of the red median to the blue median.

The 80% quantile of the ratio of the green channel to the red channel divided by the ratio of the green median to the red median.

The 90% quantile of the ratio of the green channel to the red channel divided by the ratio of the green median to the red median.

The 80% quantile of the ratio of the green channel to the blue channel divided by the ratio of the green median to the blue median.

The 90% quantile of the ratio of the green channel to the blue channel divided by the ratio of the green median to the blue median.

The 80% quantile of the ratio of the blue channel to the red channel divided by the ratio of the blue median to the red median.

The 90% quantile of the ratio of the blue channel to the red channel divided by the ratio of the blue median to the red median.

The 80% quantile of the ratio of the blue channel to the green channel divided by the ratio of the blue median to the green median.

The 90% quantile of the ratio of the blue channel to the green channel divided by the ratio of the blue median to the green median.

G. Edge Statistics

The edge statistics are formed by first performing edge detection on the input image 102 and extracting edges as lists of pixel coordinate pairs. The edges can be detected using a variety of techniques. For example, the edges are often extracted using the following procedure discussed below.

The input image 102 is first smoothed to eliminate noise. A Sobel-like operator is used to calculate the gradient. The magnitude gradient is calculated, and if the magnitude is greater than a threshold, the direction of the gradient is also calculated. The magnitude array is then normalized. The edges are thinned to a single pixel in width. The edges are labeled using their 8-connected neighbors. Small edge fragments are eliminated. Endpoints and junctions are identified, stored, and removed from the image. The image is relabeled. Curves, which are defined to be lists of edge points, are extracted for use in feature computations.

After the curves have been extracted, several characteristics of each curve are typically computed. These include the principal component directions, the length and width of a bounding box aligned with the principal components and containing the curve, the point spread in the principal component directions, average curvature, maximum curvature, and endpoint separation distance. These features computed for individual curves are used as the basis for calculating statistics for the collection of curves passing through each block.

Examples of Edge Statistics Include:

The number of endpoints within the block.

The number of junctions within the block.

The average number of neighbors of junctions.

The number of curves passing through the block.

The number of loops (closed curves) that pass through the block.

The most prominent (modal) curve direction within the block.

The number of curves oriented in the modal direction.

The average length of the curves passing through the block.

The minimum length of the curves passing through the block.

The maximum length of the curves passing through the block.

The median length of the curves passing through the block.

The average point spread in the direction of the first principal component.

The minimum point spread in the direction of the first principal component.

The maximum point spread in the direction of the first principal component.

The median point spread in the direction of the first principal component.

The average maximum curvature of the curves.

The minimum value of the maximum curvatures of the curves.

The maximum value of the maximum curvatures of the curves.

The median of the maximum curvatures of the curves.

The average ratio of length to width of the bounding boxes of the curves.

The minimum ratio of length to width of the bounding boxes of the curves.

The maximum ratio of length to width of the bounding boxes of the curves.

The median ratio of length to width of the bounding boxes of the curves.

The average ratio of the point spreads in the directions of the principal components.

The minimum ratio of the point spreads in the directions of the principal components.

The maximum ratio of the point spreads in the directions of the principal components.

The median ratio of the point spreads in the directions of the principal components.

The average ratio of average curvature to length.

The minimum ratio of average curvature to length.

The maximum ratio of average curvature to length.

The median ratio of average curvature to length.

The average ratio of endpoint separation distance to length.

The minimum ratio of endpoint separation distance to length.

The maximum ratio of endpoint separation distance to length.

The median ratio of endpoint separation distance to length.

The average ratio of the number of curve points to curve length.

The minimum ratio of the number of curve points to curve length.

The maximum ratio of the number of curve points to curve length.

The median ratio of the number of curve points to curve length.

The direction of the longest curve passing through the block.

The ratio of length to width of the longest curve passing through the block.

The ratio of the point spreads in the directions of the principal components of the longest curve passing through the block.

The ratio of the average curvature to point spread in the direction of the longest curve passing through the block.

The ratio of the endpoint separation distance to point spread in the direction of the longest curve passing through the block.

H. Texture Statistics

The texture statistics are measures of the roughness of an image. The roughness may be measured with the use of a Sobel gradient operator and a Laplacian operator. Prior to computation of the relevant statistics, the input image 102 may be smoothed to reduce and set an appropriate texture scale. The image may then be processed to produce three additional images, (1) a smoother image, (2) a smoothed gradient magnitude image, and (3) a smoothed Laplacian magnitude image. Each of those images is further processed to calculate order statistics. Calculation of the order statistics may be performed over a small (e.g., 40 pixel by 40 pixel) block or a large (e.g., 160 pixel×160 pixel) block. Such calculations may be carried out on the intensity image or an image that is formed by adding two of the usual three color channels.

Examples of Texture Statistics Include:

The ratio of the 50% quantile of the smoothed gradient magnitude image to the 50% quantile of the smoothed intensity image.

The ratio of the 50% quantile of the smoothed Laplacian magnitude image to the 50% quantile of the smoothed intensity image.

The ratio of the 50% quantile of the smoothed Laplacian magnitude image to the 50% quantile of the smoothed gradient magnitude image.

The ratio of the 95% quantile of the smoothed gradient magnitude image to the 95% quantile of the smoothed intensity image.

The ratio of the 95% quantile of the smoothed Laplacian magnitude image to the 95% quantile of the smoothed intensity image.

The ratio of the 95% quantile of the smoothed Laplacian magnitude image to the 95% quantile of the smoothed gradient magnitude image.

The ratio of the 50% quantile of the smoothed gradient magnitude image computed over a small block to the 50% quantile of the smoothed gradient magnitude image computed over a large block.

The ratio of the 50% quantile of the smoothed Laplacian magnitude image computed over a small block to the 50% quantile of the smoothed Laplacian magnitude image computed over a large block.

The ratio of the 95% quantile of the smoothed gradient magnitude image computed over a small block to the 95% quantile of the smoothed gradient magnitude image computed over a large block.

The ratio of the 95% quantile of the smoothed Laplacian magnitude image computed over a small block to the 95% quantile of the smoothed Laplacian magnitude image computed over a large block.

The ratio of the 50% quantile of the smoothed gradient magnitude of a red-plus-green image to the 50% quantile of a smoothed red-plus-green image.

The ratio of the 50% quantile of the smoothed Laplacian magnitude of a red-plus-green image to the 50% quantile of the smoothed red-plus-green image.

The ratio of the 50% quantile of the smoothed Laplacian magnitude of a red-plus-green image to the 50% quantile of the smoothed gradient magnitude of a red-plus-green image.

The ratio of the 95% quantile of the smoothed gradient magnitude of a red-plus-green image to the 95% quantile of a smoothed red-plus-green image.

The ratio of the 95% quantile of the smoothed Laplacian magnitude of a red-plus-green image to the 95% quantile of the smoothed red-plus-green image.

The ratio of the 95% quantile of the smoothed Laplacian magnitude of a red-plus-green image to the 95% quantile of the smoothed gradient magnitude of a red-plus-green image.

The ratio of the 50% quantile of the smoothed gradient magnitude of a red-plus-green image computed over a small block to the 50% quantile of the smoothed gradient magnitude of a red-plus-green image computed over a large block.

The ratio of the 50% quantile of the smoothed Laplacian magnitude of a red-plus-green image computed over a small block to the 50% quantile of the smoothed Laplacian magnitude of a red-plus-green image computed over a large block.

The ratio of the 95% quantile of the smoothed gradient magnitude of a red-plus-green image computed over a small block to the 95% quantile of the smoothed gradient magnitude of a red-plus-green image computed over a large block.

The ratio of the 95% quantile of the smoothed Laplacian magnitude of a red-plus-green image computed over a small block to the 95% quantile of the smoothed Laplacian magnitude of a red-plus-green image computed over a large block.

The ratio of the 50% quantile of the smoothed gradient magnitude of a red-plus-blue image to the 50% quantile of a smoothed red-plus-blue image.

The ratio of the 50% quantile of the smoothed Laplacian magnitude of a red-plus-blue image to the 50% quantile of the smoothed red-plus-blue image.

The ratio of the 50% quantile of the smoothed Laplacian magnitude of a red-plus-blue image to the 50% quantile of the smoothed gradient magnitude of a red-plus-blue image.

The ratio of the 95% quantile of the smoothed gradient magnitude of a red-plus-blue image to the 95% quantile of a smoothed red-plus-blue image.

The ratio of the 95% quantile of the smoothed Laplacian magnitude of a red-plus-blue image to the 95% quantile of the smoothed red-plus-blue image.

The ratio of the 95% quantile of the smoothed Laplacian magnitude of a red-plus-blue image to the 95% quantile of the smoothed gradient magnitude of a red-plus-blue image.

The ratio of the 50% quantile of the smoothed gradient magnitude of a red-plus-blue image computed over a small block to the 50% quantile of the smoothed gradient magnitude of a red-plus-blue image computed over a large block.

The ratio of the 50% quantile of the smoothed Laplacian magnitude of a red-plus-blue image computed over a small block to the 50% quantile of the smoothed Laplacian magnitude of a red-plus-blue image computed over a large block.

The ratio of the 95% quantile of the smoothed gradient magnitude of a red-plus-blue image computed over a small block to the 95% quantile of the smoothed gradient magnitude of a red-plus-blue image computed over a large block.

The ratio of the 95% quantile of the smoothed Laplacian magnitude of a red-plus-blue image computed over a small block to the 95% quantile of the smoothed Laplacian magnitude of a red-plus-blue image computed over a large block.

The ratio of the 50% quantile of the smoothed gradient magnitude of a green-plus-blue image to the 50% quantile of a smoothed green-plus-blue image.

The ratio of the 50% quantile of the smoothed Laplacian magnitude of a green-plus-blue image to the 50% quantile of the smoothed green-plus-blue image.

The ratio of the 50% quantile of the smoothed Laplacian magnitude of a green-plus-blue image to the 50% quantile of the smoothed gradient magnitude of a green-plus-blue image.

The ratio of the 95% quantile of the smoothed gradient magnitude of a green-plus-blue image to the 95% quantile of a smoothed green-plus-blue image.

The ratio of the 95% quantile of the smoothed Laplacian magnitude of a green-plus-blue image to the 95% quantile of the smoothed green-plus-blue image.

The ratio of the 95% quantile of the smoothed Laplacian magnitude of a green-plus-blue image to the 95% quantile of the smoothed gradient magnitude of a green-plus-blue image.

The ratio of the 50% quantile of the smoothed gradient magnitude of a green-plus-blue image computed over a small block to the 50% quantile of the smoothed gradient magnitude of a green-plus-blue image computed over a large block.

The ratio of the 50% quantile of the smoothed Laplacian magnitude of a green-plus-blue image computed over a small block to the 50% quantile of the smoothed Laplacian magnitude of a green-plus-blue image computed over a large block.

The ratio of the 95% quantile of the smoothed gradient magnitude of a green-plus-blue image computed over a small block to the 95% quantile of the smoothed gradient magnitude of a green-plus-blue image computed over a large block.

The ratio of the 95% quantile of the smoothed Laplacian magnitude of a green-plus-blue image computed over a small block to the 95% quantile of the smoothed Laplacian magnitude of a green-plus-blue image computed over a large block.

I. Texture Color Statistics

The texture color statistics are used to capture additional information about the color distributions of textured and non-textured blocks. They are formed by using a difference image formed by subtracting one color channel from another. For example, a green-minus-red image causes tattoos on skin to stand out as a set of white curves.

Examples of Texture Color Statistics Include:

The ratio of the 50% quantile of a green-minus-red image to the 50% quantile of the intensity image.

The ratio of the 95% quantile of a green-minus-red image to the 95% quantile of the intensity image.

The ratio of the 50% quantile of a green-minus-blue image to the 50% quantile of the intensity image.

The ratio of the 95% quantile of a green-minus-blue image to the 95% quantile of the intensity image.

The ratio of the 50% quantile of a blue-minus-red image to the 50% quantile of the intensity image.

The ratio of the 95% quantile of a blue-minus-red image to the 95% quantile of the intensity image.

J. Directional Texture Statistics

Directional texture statistics are formed by first smoothing an image to remove noise. The image is then further smoothed along each of a preset collection of directions. Smoothing an image in a particular direction is accomplished by performing weighted sums of the pixels intersected by a set of parallel line segments having that direction. For each directionally smoothed image, a gradient magnitude image is computed and order statistics are calculated for each block.

Examples of Directional Texture Statistics Include:

The average of the 50% quantile of the gradient magnitude taken over all smoothing directions.

The average of the 95% quantile of the gradient magnitude taken over all smoothing directions.

The maximum of the 50% quantile of the gradient magnitude taken over all smoothing directions.

The maximum of the 95% quantile of the gradient magnitude taken over all smoothing directions.

K. Block Based Statistics

In some implementations, feature statistics are generated by initially segmenting the input image 102 using a generic unguided segmentation program. This may not output a single block containing a tattoo. Instead, depending upon the settings, tattoos will likely be represented within a number of blocks. However, statistics such as the number of blocks overlapping a block may be useful for separating blocks containing tattoos from those that do not.

Before the block statistics are calculated, several features are typically calculated for each block including block size, block length along the major axis of the principal components, block width in the orthogonal direction, average block intensity, and average block color.

Examples of Block Based Statistics Include:

The number of blocks overlapping a block.

The size of the largest block overlapping a block.

The size of the longest block overlapping a block.

The size of the brightest block overlapping a block.

The size of the darkest block overlapping a block.

The size of the reddest block overlapping a block.

The size of the greenest block overlapping a block.

The size of the bluest block overlapping a block.

The length of the largest block overlapping a block.

The length of the longest block overlapping a block.

The length of the brightest block overlapping a block.

The length of the darkest block overlapping a block.

The length of the reddest block overlapping a block.

The length of the greenest block overlapping a block.

The length of the bluest block overlapping a block.

The ratio of width to length of the largest block overlapping a block.

The ratio of width to length of the longest block overlapping a block.

The ratio of width to length of the brightest block overlapping a block.

The ratio of width to length of the darkest block overlapping a block.

The ratio of width to length of the reddest block overlapping a block.

The ratio of width to length of the greenest block overlapping a block.

The ratio of width to length of the bluest block overlapping a block.

The ratio of the size of the brightest block to the size of the darkest block.

The ratio of the size of the reddest block to the size of the greenest block.

The ratio of the size of the reddest block to the size of the bluest block.

The ratio of the size of the greenest block to the size of the bluest block.

The ratio of the length of the brightest block to the length of the darkest block.

The ratio of the length of the reddest block to the length of the greenest block.

The ratio of the length of the reddest block to the length of the bluest block.

The ratio of the length of the greenest block to the length of the bluest block.

The average size of the blocks overlapping a block.
The average length of the blocks overlapping a block.
The average width of the blocks overlapping a block.
The ratio of average size to the square of average length.
The ratio of average width to average length.
The maximum ratio of size to the square of length.
The maximum ratio of width to length.
The intensity of the largest block.
The intensity of the longest block.
The intensity of the brightest block.
The intensity of the darkest block.
The ratio of the intensity of the darkest block to that of the brightest block.

The redness of the largest block.
The greenness of the largest block.
The blueness of the largest block.
The redness of the longest block.
The greenness of the longest block.
The blueness of the longest block.
The redness of the brightest block.
The greenness of the brightest block.
The blueness of the brightest block.
The redness of the darkest block.
The greenness of the darkest block.
The blueness of the darkest block.
The ratio of the greenness of the greenest block to the redness of the reddest block.

The ratio of the blueness of the bluest block to the redness of the reddest block.

The ratio of the blueness of the bluest block to the greenness of the greenest block.

The ratio of the redness of the brightest block to the redness of the darkest block.

The ratio of the greenness of the brightest block to the greenness of the darkest block.

The ratio of the blueness of the brightest block to the blueness of the darkest block.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In some implementations, a computer program is provided, and the program is embodied on a computer readable medium. In an example implementation, the system is executed on a single computer system, without requiring a connection to a sever computer. In a further implementation, the system is being run in a Windows® environment (Windows is a registered trademark of Microsoft Corporation, Redmond, Wash.). In yet another implementation, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some implementations, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example implementation" or "some implementations" of the present disclosure are not intended to be interpreted as excluding the existence of additional implementations that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method performed by one or more computers, the method comprising:
   obtaining an image;
   obtaining block pattern data identifying multiple blocks within the image, the block pattern data comprising (i) a two-dimensional array of overlapping blocks for the image, each block within the two-dimensional array corresponding a particular region within the obtained image, and (ii) a subset of the multiple blocks of the image that have a respective confidence score satisfying a predetermined threshold value;
   identifying candidate tattoo regions of the image based on the subset of the multiple blocks of the image that have a respective confidence score satisfying the predetermined threshold;
   processing one or more attributes of each of the candidate tattoo regions; and
   determining, based on processing the one or more attributes of each of the candidate tattoo regions, that the image includes a tattoo.

2. The method of claim 1, wherein the confidence scores for each block included in the subset of multiple blocks represents a likelihood that at least a portion of a corresponding block includes a predetermined graphical attribute associated with tattoos.

3. The method of claim 1, wherein:
   the one or more attributes of each of the candidate tattoo regions comprises an average confidence score for blocks included in a particular candidate tattoo region;
   processing the one or more attributes of each of the candidate tattoo regions comprises identifying regions from among the candidate tattoo regions that have an average confidence score that exceeds a threshold value.

4. The method of claim 1, wherein:
   the one or more attributes of each of the candidate tattoo regions comprises a number of blocks included in a particular candidate tattoo region;
   processing the one or more attributes of each of the candidate tattoo regions comprises identifying regions from among the candidate tattoo regions that have a number of blocks that exceeds a threshold number of blocks.

5. The method of claim 1, wherein:
   the one or more attributes of each of the candidate tattoo regions comprises a number of pixels included in a particular candidate tattoo region;
   determining that the image includes a tattoo comprises determining, based on the number of pixels included in the candidate regions, whether the image includes a partial tattoo or a full tattoo.

6. The method of claim 5, wherein determining whether the image includes a partial tattoo or a full tattoo comprises:
   determining that at least one of the candidate tattoo regions has a number of pixels that exceeds a threshold number of pixels; and
   based on determining that at least one of the candidate tattoo regions has a number of pixels that exceeds a threshold number of pixels, determining that the image includes a partial tattoo.

7. The method of claim 1, wherein:
   the one or more attributes of each of the candidate tattoo regions comprises a shape that is identified as being included in a particular candidate tattoo region;
   processing the one or more attributes of each of the candidate tattoo regions comprises determining that two or more regions from among the candidate tattoo regions includes a portion of the same shape; and
   determining that the image includes a tattoo comprises determining that the image includes a single tattoo based on determining that two or more regions from among the candidate tattoo regions includes a portion of the same shape.

8. The method of claim 1, wherein:
   the one or more attributes of each of the candidate tattoo regions comprises a shape that is identified as being included in a particular candidate tattoo region;
   processing the one or more attributes of each of the candidate tattoo regions comprises determining that none of the regions from among the candidate tattoo regions includes a portion of the same shape; and
   determining that the image includes a tattoo comprises determining that the image includes multiple tattoos based on none of the regions from among the candidate tattoo regions includes a portion of the same shape.

9. A system comprising:
one or more computers; and
one or more storage devices storing instructions that, when executed by the one or more computers, cause the one or more computers to perform operations comprising:
obtaining an image;
obtaining block pattern data identifying multiple blocks within the image, the block pattern data comprising (i) a two-dimensional array of overlapping blocks for the image, each block within the two-dimensional array corresponding a particular region within the obtained image, and (ii) a subset of the multiple blocks of the image that have a respective confidence score satisfying a predetermined threshold value;
identifying candidate tattoo regions of the image based on the subset of the multiple blocks of the image that have a respective confidence score satisfying the predetermined threshold;
processing one or more attributes of each of the candidate tattoo regions; and
determining, based on processing the one or more attributes of each of the candidate tattoo regions, that the image includes a tattoo.

10. The system of claim 9, wherein the confidence scores for each block included in the subset of multiple blocks represents a likelihood that at least a portion of a corresponding block includes a predetermined graphical attribute associated with tattoos.

11. The system of claim 9, wherein:
the one or more attributes of each of the candidate tattoo regions comprises an average confidence score for blocks included in a particular candidate tattoo region;
processing the one or more attributes of each of the candidate tattoo regions comprises identifying regions from among the candidate tattoo regions that have an average confidence score that exceeds a threshold value.

12. The system of claim 9, wherein:
the one or more attributes of each of the candidate tattoo regions comprises a number of blocks included in a particular candidate tattoo region;
processing the one or more attributes of each of the candidate tattoo regions comprises identifying regions from among the candidate tattoo regions that have a number of blocks that exceeds a threshold number of blocks.

13. The system of claim 9, wherein:
the one or more attributes of each of the candidate tattoo regions comprises a number of pixels included in a particular candidate tattoo region;
determining that the image includes a tattoo comprises determining, based on the number of pixels included in the candidate regions, whether the image includes a partial tattoo or a full tattoo.

14. The system of claim 13, wherein determining whether the image includes a partial tattoo or a full tattoo comprises:
determining that at least one of the candidate tattoo regions has a number of pixels that exceeds a threshold number of pixels; and
based on determining that at least one of the candidate tattoo regions has a number of pixels that exceeds a threshold number of pixels, determining that the image includes a partial tattoo.

15. The system of claim 9, wherein:
the one or more attributes of each of the candidate tattoo regions comprises a shape that is identified as being included in a particular candidate tattoo region;
processing the one or more attributes of each of the candidate tattoo regions comprises determining that two or more regions from among the candidate tattoo regions includes a portion of the same shape; and
determining that the image includes a tattoo comprises determining that the image includes a single tattoo based on determining that two or more regions from among the candidate tattoo regions includes a portion of the same shape.

16. A non-transitory computer-readable storage device encoded with computer program instructions that, when executed by one or more computers, cause the one or more computers to perform operations comprising:
obtaining an image;
obtaining block pattern data identifying multiple blocks within the image, the block pattern data comprising (i) a two-dimensional array of overlapping blocks for the image, each block within the two-dimensional array corresponding a particular region within the obtained image, and (ii) a subset of the multiple blocks of the image that have a respective confidence score satisfying a predetermined threshold value;
identifying candidate tattoo regions of the image based on the subset of the multiple blocks of the image that have a respective confidence score satisfying the predetermined threshold;
processing one or more attributes of each of the candidate tattoo regions; and
determining, based on processing the one or more attributes of each of the candidate tattoo regions, that the image includes a tattoo.

17. The non-transitory computer-readable storage device of claim 16, wherein the confidence scores for each block included in the subset of multiple blocks represents a likelihood that at least a portion of a corresponding block includes a predetermined graphical attribute associated with tattoos.

18. The non-transitory computer-readable storage device of claim 16, wherein:
the one or more attributes of each of the candidate tattoo regions comprises an average confidence score for blocks included in a particular candidate tattoo region;
processing the one or more attributes of each of the candidate tattoo regions comprises identifying regions from among the candidate tattoo regions that have an average confidence score that exceeds a threshold value.

19. The non-transitory computer-readable storage device of claim 16, wherein:
the one or more attributes of each of the candidate tattoo regions comprises a number of blocks included in a particular candidate tattoo region;
processing the one or more attributes of each of the candidate tattoo regions comprises identifying regions from among the candidate tattoo regions that have a number of blocks that exceeds a threshold number of blocks.

20. The non-transitory computer-readable storage device of claim 16, wherein:
the one or more attributes of each of the candidate tattoo regions comprises a number of pixels included in a particular candidate tattoo region;

determining that the image includes a tattoo comprises determining, based on the number of pixels included in the candidate regions, whether the image includes a partial tattoo or a full tattoo.

* * * * *